US008615343B2

(12) United States Patent
Aldighieri et al.

(10) Patent No.: US 8,615,343 B2
(45) Date of Patent: Dec. 24, 2013

(54) VEHICLE PLUG-IN ADVISORY SYSTEM AND METHOD

(75) Inventors: Paul A Aldighieri, Grosse Pointe Farms, MI (US); Dale Gilman, Beverly Hills, MI (US); Ryan J Skaff, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/479,717

(22) Filed: May 24, 2012

(65) Prior Publication Data

US 2013/0173102 A1 Jul. 4, 2013

Related U.S. Application Data

(60) Provisional application No. 61/581,687, filed on Dec. 30, 2011.

(51) Int. Cl.
*B60L 9/00* (2006.01)
(52) U.S. Cl.
USPC .......................................................... 701/22
(58) Field of Classification Search
USPC .......................................................... 701/22
See application file for complete search history.

(56) References Cited

U.S. PATENT DOCUMENTS

| 5,900,734 A | 5/1999 | Munson |
| 2011/0178654 A1* | 7/2011 | Bauerle et al. ..................... 701/2 |
| 2012/0179319 A1 | 7/2012 | Gilman et al. |

FOREIGN PATENT DOCUMENTS

WO 2010149613 A1 12/2010

* cited by examiner

*Primary Examiner* — James Trammell
*Assistant Examiner* — Michael D Lang
(74) *Attorney, Agent, or Firm* — Jennifer M. Stec; Brooks Kushman P.C.

(57) ABSTRACT

Many plug-in electric vehicles include a high voltage battery for outputting electrical power to a traction motor in order to propel the vehicle. Storing a plug-in electric vehicle in cold or hot ambient temperatures can cause the high voltage battery to become performance limited. If the vehicle has a battery thermal system, then plugging in the vehicle to an external power supply when not in use can help keep the battery at a temperature where performance will not be limited. To educate a driver and increase the probability of avoiding performance limits, a user interface may convey a reminder message advising or alerting the driver to plug the vehicle in to an external power supply at the end of a drive when the ambient temperature is extreme.

16 Claims, 5 Drawing Sheets

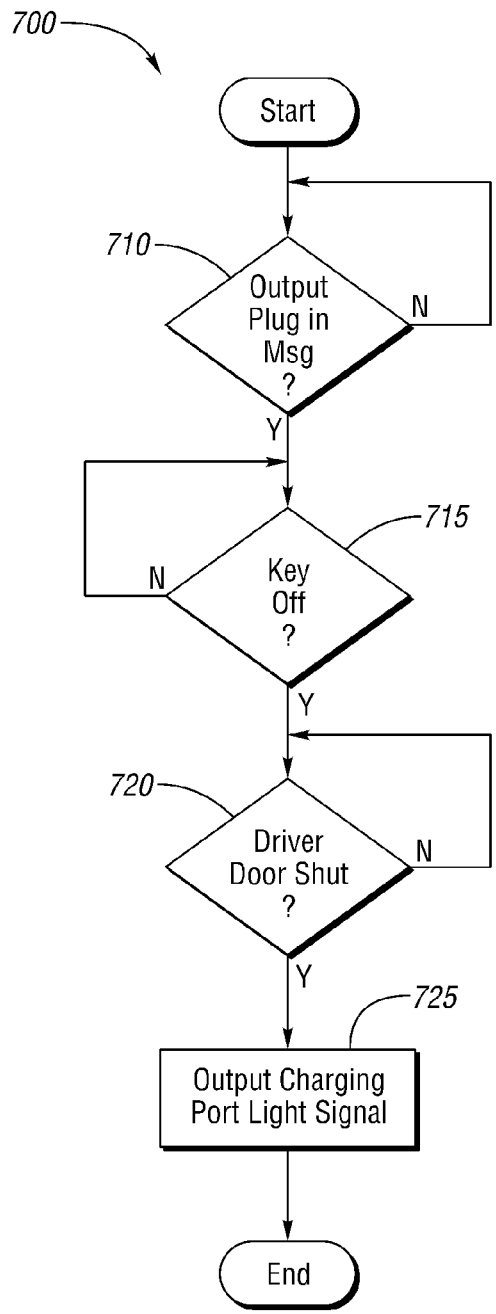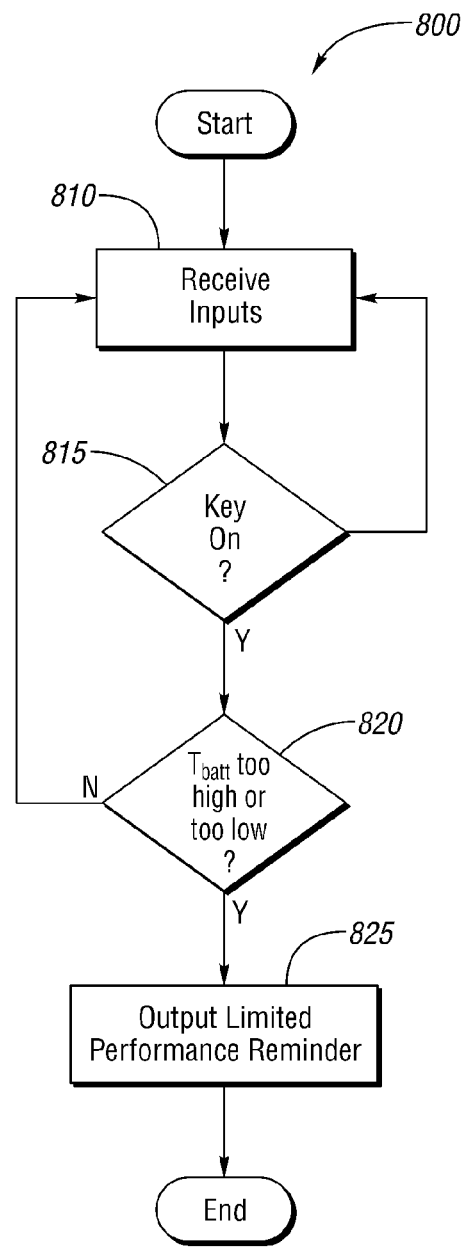
Fig. 7
Fig. 8

VEHICLE PLUG-IN ADVISORY SYSTEM AND METHOD

CROSS-REFERENCE TO RELATED APPLICATIONS

This application claims the benefit of U.S. provisional Application No. 61/581,687, filed Dec. 30, 2011, the disclosure of which is incorporated in its entirety by reference herein.

TECHNICAL FIELD

One or more embodiments of the present application relate to a system and method for advising a driver of a plug-in electric vehicle to plug the vehicle in to an external power supply in extreme ambient conditions when not in use.

BACKGROUND

Plug-in electric vehicle, including battery electric vehicles (BEVs) and plug-in hybrid electric vehicles (PHEVs), may be connected to an external power supply for charging a vehicle battery. Such vehicles typically include a charge cord that extends from an external power supply and is physically connected to a vehicle charging port to facilitate charging of the vehicle battery. The vehicle battery provides electrical power to operate a motor, which generates wheel torque for propelling the vehicle. In extreme temperatures, the vehicle battery may become performance limited. A battery that is either too cold or too hot can significantly impact the performance and drivability of the vehicle.

Vehicles include a number of interfaces, such as gauges, indicators, and displays to convey information to the driver regarding the vehicle and its surroundings. With the advent of new technologies, these user interfaces have become more sophisticated. For example, some vehicles include battery state of charge gauges and vehicle range indicators. Also, many hybrid electric vehicles (HEVs) incorporate gauges that attempt to provide the driver with information on the various hybrid driving states. Some gauges will indicate to the driver when the vehicle is being propelled by the engine alone, the motor alone, or a combination of the two. Similarly, a display may indicate when the motor is operating as a generator, and is recharging an energy storage device, such as the battery. As new technologies increase in complexity, drivers rely on these interfaces to convey information that will help them optimize vehicle performance and enhance their driving experience.

SUMMARY

According to one or more embodiments of the present application, a control system and method for advising a driver to plug a vehicle into an external power supply is provided. The control system may include at least a controller and a user interface in communication with each other. The controller may be configured to receive input signals indicative of transmission mode, charger connectivity status and ambient temperature. Moreover, the controller may be configured to output a plug-in advisory signal based upon the input signals. The user interface may be configured to output a plug-in advisory message in response to the plug-in advisory signal. In one or more embodiments, the user interface may include a display configured to convey the plug-in advisory message visually. Alternatively, the user interface may include a speaker configured to convey the plug-in advisory message audibly.

The transmission mode may include at least a park mode. Further, the charger connectivity status may indicate whether a vehicle charger is disconnected from an external power supply. According to one or more embodiments, the controller may be configured to output the plug-in advisory signal when the input signals indicate the vehicle is in the park mode, the vehicle charger is disconnected from the external power supply, and the ambient temperature is below a first ambient temperature threshold. In this regard, the plug-in advisory message may include a recommendation to plug the vehicle into the external power supply due to a low ambient temperature. The controller may also be configured to output the plug-in advisory signal when the input signals indicate the vehicle is in the park mode, the vehicle charger is disconnected from the external power supply, and the ambient temperature is above a second ambient temperature threshold. In this instance, the plug-in advisory message may include a recommendation to plug the vehicle into the external power supply due to a high ambient temperature.

The controller may be further configured to detect driver egress from the vehicle and output a charging port light signal when the vehicle is in the park mode, the vehicle charger is disconnected from the external power supply, the ambient temperature is below a first ambient temperature threshold or above a second ambient temperature threshold, and driver egress is detected. In one or more embodiments, driver egress may be detected when an ignition switch transitions to an OFF position and a driver door closes. The charging port light signal may at least temporarily illuminate a charging port light associated with a vehicle charge port and disposed proximate thereto.

According to one or more alternate embodiments, a control system and method for reminding a driver about performance limitations due to extreme battery temperatures is provided. The control system may include a controller and a user interface in communication with each other. The controller may be configured to receive input signals indicative of an ignition switch position and battery temperature. Moreover, the controller may be configured to output a message signal based on the input signals. The user interface may be configured to output a limited performance reminder message in response to the message signal. The controller may be configured to output the message signal when an ignition switch is in an active position and the battery temperature is below a first battery temperature threshold or above a second battery temperature threshold. The active position may include at least one of an accessories position and an ON position.

BRIEF DESCRIPTION OF THE DRAWINGS

FIG. 7 is a simplified, exemplary flow chart depicting a method for illuminating a charging port in accordance with one or more embodiments of the present application; and FIG. 8 is a simplified, exemplary flow chart depicting a method for conveying a limited performance reminder message in accordance with one or more embodiments of the present application.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Many plug-in electric vehicles include a high voltage battery for outputting electrical power to a traction motor in order to propel the vehicle. Storing a plug-in electric vehicle in cold or hot ambient temperatures can cause the high voltage battery to become performance limited. If the vehicle has a battery thermal system, then plugging in the vehicle to an external power supply when not in use can help keep the battery at a temperature where performance will not be limited. To educate a driver and increase the probability of avoiding performance limits, a user interface may convey a reminder message advising or alerting the driver to plug the vehicle in to an external power supply at the end of a drive when the ambient temperature is extreme.

Figure 1:
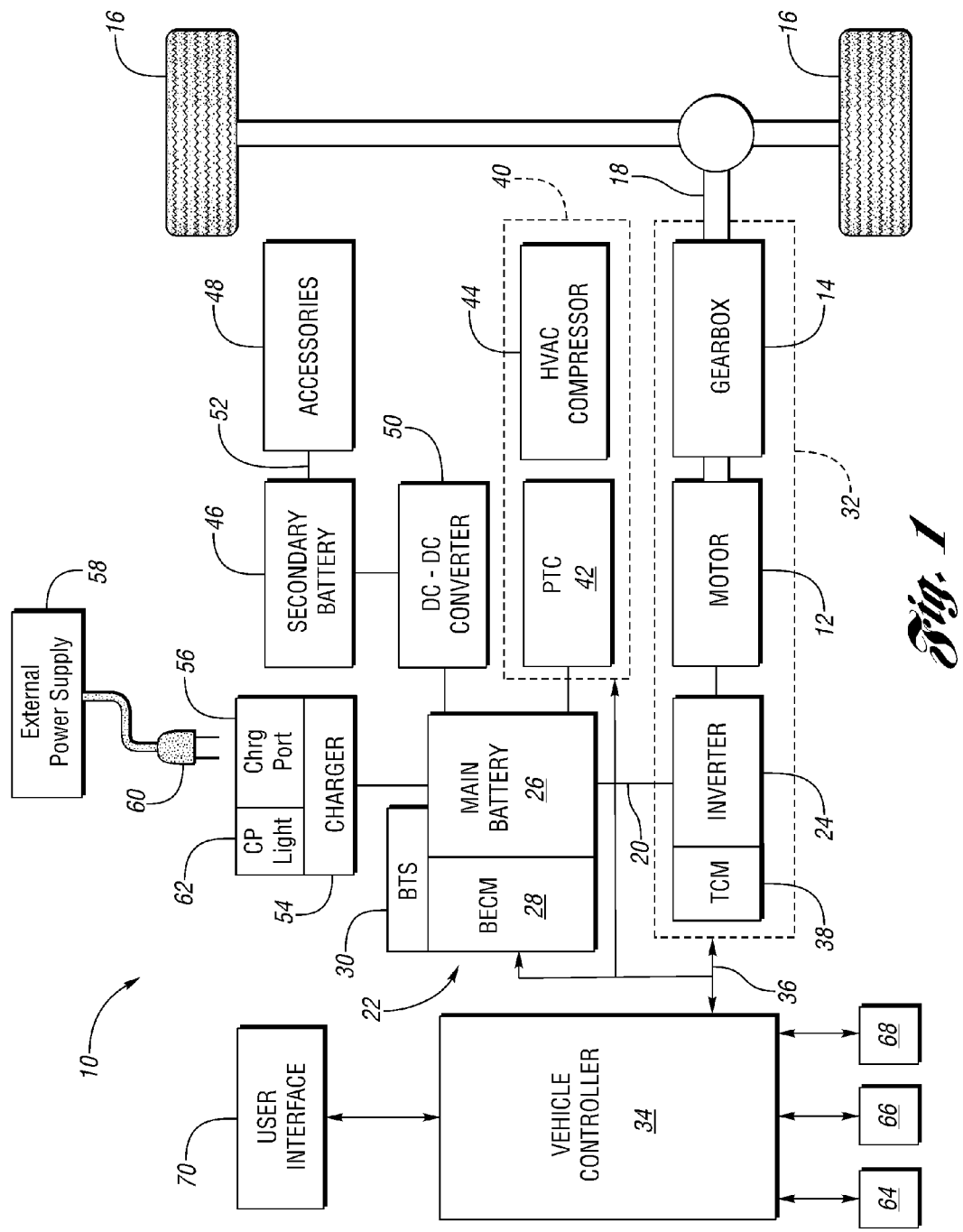
FIG. 1 is a simplified, exemplary schematic diagram of a plug-in electric vehicle in accordance with one or more embodiments of the present application.

Referring now to the drawings, FIG. 1 is a simplified, exemplary schematic diagram of a vehicle 10. The illustrated embodiment depicts the vehicle 10 as a battery electric vehicle (BEV), which is an all-electric vehicle propelled by one or more electric motors 12 without assistance from an internal combustion engine. The motor 12 may receive electrical power and provide mechanical rotational output power. The motor 12 may be mechanically connected to a gearbox 14 for adjusting the output torque and speed of the motor 12 by a predetermined gear ratio. The gearbox 14 may be connected to a set of drive wheels 16 by an output shaft 18. Other embodiments of the vehicle 10 may include multiple motors (not shown) for propelling the vehicle 10. The motor 12 may also function as a generator for converting mechanical power into electrical power. A high voltage bus 20 electrically connects the motor 12 to an energy storage system 22 through an inverter 24.

The energy storage system 22 may include a main battery 26 and a battery energy control module (BECM) 28. The main battery 26 may be a high voltage battery that is capable of outputting electrical power to operate the motor 12. According to one or more embodiments, the main battery 26 may be a battery pack made up of several battery modules. Each battery module may contain a plurality of battery cells. The battery cells may be air cooled using existing vehicle cabin air. The battery cells may also be heated or cooled using a battery thermal system 30, such as a fluid coolant system. The BECM 28 may act as a controller for the main battery 26. The BECM 28 may also include an electronic monitoring system that manages temperature and state of charge of each of the battery cells. Other embodiments of the vehicle 10 may utilize different types of energy storage systems, such as capacitors and fuel cells (not shown).

As shown in FIG. 1, the motor 12, the gearbox 14, and the inverter 24 may collectively be referred to as a transmission 32. To control the components of the transmission 32, a vehicle control system, shown generally as a vehicle controller 34, may be provided. Although it is shown as a single controller, the vehicle controller 34 may include multiple controllers that may be used to control multiple vehicle systems. For example, the vehicle controller 34 may be a vehicle system controller/powertrain control module (VSC/PCM). In this regard, the PCM portion of the VSC/PCM may be software embedded within the VSC/PCM, or it can be a separate hardware device. The vehicle controller 34 generally includes any number of microprocessors, ASICs, ICs, memory (e.g., FLASH, ROM, RAM, EPROM and/or EEPROM) and software code to co-act with one another to perform a series of operations. The vehicle controller 34 may communicate with other controllers (e.g., BECM) over a hardline vehicle connection 36 using a common bus protocol (e.g., CAN).

Just as the main battery 26 includes a BECM, other devices controlled by the vehicle controller 34 may have their own controllers or sub-controllers. For example, the transmission 32 may include a transmission control module (TCM) 38, configured to coordinate control of specific components within the transmission 32, such as the motor 12 and/or the inverter 24. The TCM 38 may communicate with the vehicle controller 34 over the CAN bus 36. The TCM 38 may include a motor controller for monitoring, among other things, the position, speed, power consumption and temperature of the motor 12. Using this information and a throttle command by the driver, the motor controller and the inverter 24 may convert the direct current (DC) voltage supply by the main battery 26 into signals that can be used to drive the motor 12. Some or all of these various controllers can make up a control system, which, for reference purposes, may be the vehicle controller 34. Although illustrated and described in the context of the vehicle 10, which is a BEV, it is understood that embodiments of the present application may be implemented on other types of plug-in vehicles, such as plug-in hybrid electric vehicles (PHEVs).

The vehicle 10 may also include a climate control system 40 for heating and cooling various vehicle components. The climate control system 40 may include a high voltage positive temperature coefficient (PTC) electric heater 42 and a high voltage electric HVAC compressor 44. The PTC 42 may be used to heat coolant that circulates to a passenger car heater. Heat from the PTC 42 may also be circulated to the main battery 26. Both the PTC 42 and the HVAC compressor 44 may draw electrical energy directly from the main battery 26. The climate control system 40 may include a controller (not shown) for communicating with the vehicle controller 34 over the CAN bus 36. The on/off status of the climate control system 40 can be communicated to the vehicle controller 34, and can be based on, for example, the status of an operator actuated switch, or the automatic control of the climate control system 40 based on related functions such as window defrost.

In addition to the main battery 26, the vehicle 10 may include a separate, secondary battery 46, such as a typical 12-volt battery. The secondary battery 46 may be used to power various vehicle accessories, headlights, and the like (collectively referred to herein as accessories 48). A DC-to-DC converter 50 may be electrically interposed between the main battery 26 and the secondary battery 46. The DC-to-DC converter 50 may adjust, or "step down" the voltage level to allow the main battery 26 to charge the secondary battery 46. A low voltage bus 52 may electrically connect the DC-to-DC converter 50 to the secondary battery 46 and the accessories 48.

The vehicle 10 may further include an alternating current (AC) charger 54 for charging the main battery 26. The charger 54 may be connected to a charging port 56 for receiving AC power from an external power supply 58. The external power supply 58 may include an adapter 60 (e.g., a plug) for connecting to the charging port 56 at the vehicle's exterior. The external power supply 58 itself may be connected to an electrical power grid. The charger 54 may include power electronics used to convert, or "rectify" the AC power received from the external power supply 58 to DC power for charging the main battery 26. The Charger 54 may be configured to accommodate one or more conventional voltage sources from the external power supply (e.g., 110 volt, 220 volt, etc.). The external power supply 58 may be any external power source accessible by a vehicle operator for connecting to, or "plugging in" the vehicle 10 via the charging port 56. The vehicle 10 may include one or more charging port lights 62 associated with the charging port 56. The charging port light 62 may be disposed within the charging port 56 or proximate thereto. The charging port light 62 may illuminate to provide an external visual indication of battery and/or charger related information. For instance, the charging port light 62 may illuminate when the vehicle 10 is plugged in to indicate a charging status. The charging port light 62 may also provide an external indication of the state of charge of the main battery 26.

Also shown in FIG. 1 are simplified schematic representations of a driver controls system 64, a security system 66, and a navigation system 68. The driver controls system 64 may include braking, acceleration, gear selection (shifting), and ignition systems (all not shown). The braking system may include a brake pedal, position sensors, pressure sensors, or some combination thereof, as well as a mechanical connection to the vehicle wheels, such as the primary drive wheels 16, to effect friction braking. The braking system may also be configured for regenerative braking, wherein braking energy may be captured and stored as electrical energy in the main battery 26. The braking system may further include a parking brake. The parking brake may be activated or engaged by a driver to lock the non-driven wheels (not shown) and prevent them from moving. The acceleration system may include an accelerator pedal having one or more sensors, which, like the sensors in the braking system, may provide information such as throttle input to the vehicle controller 34.

The gear selection system may include a shifter for manually selecting a gear setting of the gearbox 14. The gear selection system may include a shift position sensor for providing shifter selection information (e.g., PRNDL) to the vehicle controller 34 corresponding to a selected transmission operating mode. In one or more embodiments, the transmission 32 may be an automatic transmission, which can automatically change gear ratios as the vehicle moves, freeing the driver from having to shift gears manually. Most automatic transmissions have a defined set of gear ranges, often with a parking pawl feature that locks the output shaft 18 of the transmission 32. The transmission 32 may have a number of transmission operating modes. The transmission operating modes may include, for example, a park mode, a reverse mode, a neutral mode, a drive mode, and a low gear mode. The transmission 32 may include additional transmission modes, such as an overdrive mode, as understood by one of ordinary skill in the art. The TCM 38 may coordinate control of the transmission components (e.g., the gearbox 14) to effectuate the transmission operating mode selection in response to the shifter position. Selection of the park mode may mechanically lock the output shaft 18 of the transmission 32, restricting the vehicle 10 from moving in any direction. The parking pawl may prevent the transmission from rotating, and therefore the vehicle from moving, although the vehicle's non-driven wheels may still rotate freely. One or more embodiments of the present application may be employed in other types of automated transmissions, such as continuous variable transmissions (CVTs) and semi-automatic transmissions, or may be implemented in vehicles that utilize a manual transmission.

The ignition system may include an ignition switch for turning the vehicle 10 on and off. The ignition switch may have a number of ignition switch positions that may be selected by a driver and transmitted to the vehicle controller 34. For example, a driver may manipulate the ignition switch by turning a key inserted into a lock cylinder. Alternatively, the ignition switch position may be selected with the use of a pushbutton. The ignition switch positions may include, for example, an OFF position, an accessories position, and an ON position. The vehicle 10 may be turned off when the ignition switch transitions to the OFF position. When the ignition switch is in the accessories position, certain accessories, such as the radio, may be powered; however, accessories that use too much battery power, such as window motors, may remain off in order to prevent the main battery 26 or secondary battery 46 from being drained. The ON position may turn on all of the vehicle's systems by connecting the main battery 26 to the vehicle controller 34 using a large relay (not shown); this is the position the ignition switch may remain in while the vehicle 10 is operating. Transitioning the ignition switch to the OFF position may disconnect the main battery 26 from the vehicle controller 34, thereby shutting down the vehicle 10.

In one or more embodiments of the present application, the safety system 66 may include door sensors for providing vehicle door information to the vehicle controller 34. For example, the door sensors may signal the locked/unlocked state of a vehicle door as well as indicate whether the door is opened or closed. The navigation system 68 may include a navigation display, a global positioning system (GPS) unit, a navigation controller and inputs for receiving destination information or other data from a driver. These components may be unique to the navigation system 68 or shared with other systems. The navigation system 68 may also communicate distance and/or location information associated with the vehicle 10, its target destinations, or other relevant GPS waypoints.

In addition to the foregoing, the vehicle 10 may include a user interface 70 to facilitate communications with a driver. The user interface 70 may communicate with the vehicle controller 34 and may provide relevant vehicle content to a driver of the vehicle 10. The vehicle controller 34 may be configured to receive input signals that are indicative of current operating and environmental conditions of the vehicle 10. For instance, the vehicle controller 34 may receive input signals from the BECM 28, the transmission 32 (e.g., motor 12 and/or inverter 24), the climate control system 40, the driver controls system 64, the security system 66, the navigation system 68, or the like. The vehicle controller 34 may provide output to the user interface 70 such that the user interface conveys advisory messages and/or reminders that can help improve vehicle performance, or other information relating to the operation of the vehicle 10, to a driver.

Figure 2:
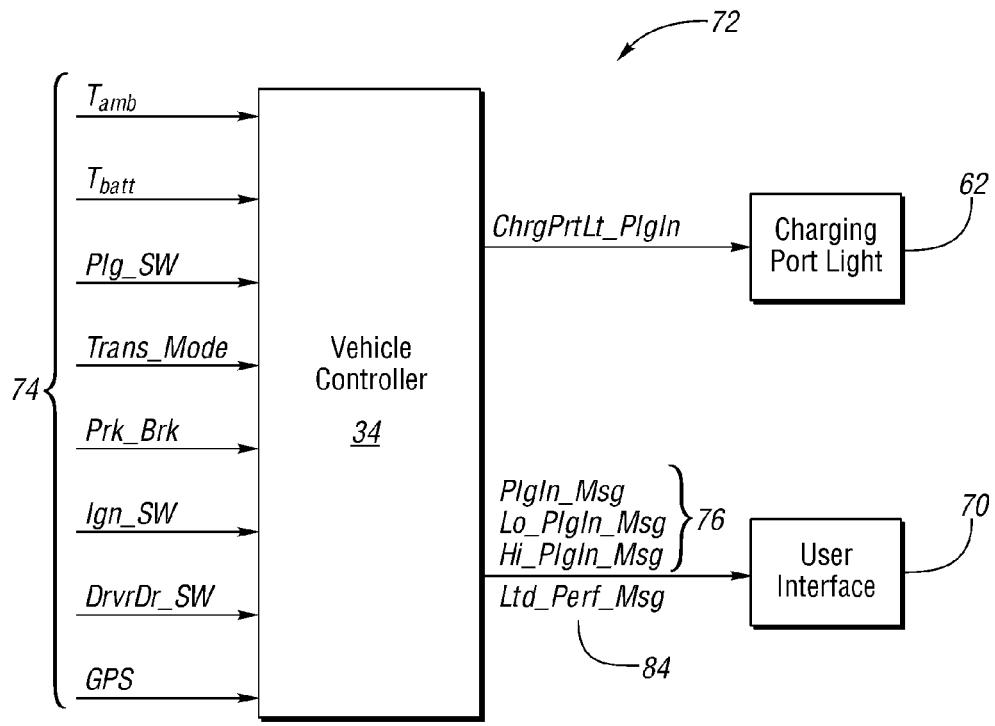
FIG. 2 is a simplified, functional block diagram of a control system for the vehicle in accordance with one or more embodiments of the present application.

FIG. 2 is a simplified, functional block diagram of a control system 72 for the vehicle 10 in accordance with one or more embodiments of the present application. The control system 72 may include the vehicle controller 34 and the user interface 70 that are in communication with each other. The vehicle controller 34 may receive input signals 74 indicative of vehicle and/or environmental conditions and may output one or more plug-in advisory signals 76 in response to the input signals 74. The vehicle controller 34 may transmit the plug-in advisory signal 76 to the user interface 70, which may in turn convey a plug-in advisory message (PlgIn_Msg) corresponding to the plug-in advisory signal 76 to the driver. The vehicle controller 34 may output the plug-in advisory signal 76 based on whether the input signals 74 indicate that certain conditions are met. According to one or more embodiments, the input signals 74 may be indicative of a trip conclusion. A trip conclusion may generally refer to any end of a vehicle drive or an arrival at a destination (e.g., home residence). To this end, the input signals 74 indicative of a trip conclusion may generally include inputs that might suggest or signify the drive has ended and/or the driver has reached a destination. As a result, the vehicle 10 may be shut off for some length of time. As non-limiting examples, a trip conclusion may be indicated by a transition of the transmission to the park mode, a transition of the ignition switch to the OFF position, the activation of the parking brake, a global positioning system (GPS) location, or the like.

The vehicle controller 34 may receive a transmission mode signal (Trans_Mode) indicating the current transmission operating mode. When a destination has been reached, the driver may place the transmission 32 into the park mode prior to exiting the vehicle 10 to prevent the vehicle 10 from moving after it is vacated. Many vehicles also require the transmission to be in the park mode before the vehicle can be turned off using the ignition switch. Accordingly, a transition of the transmission 32 from one transmission operating mode to the park mode may be an indication that the vehicle will be shut off for a length of time. Thus, the transmission mode signal (Trans_Mode) may be indicative of a trip conclusion.

The vehicle controller 34 may receive an ignition switch signal (Ign_SW) indicating the position of the ignition switch. At the end of a trip, the driver may turn the ignition switch to the OFF position in order to shut down all of the vehicle systems. The transition of the ignition switch to the OFF position may be indicated by the ignition switch signal (Ign_SW). Thus, the ignition switch signal (Ign_SW) may also be indicative of a trip conclusion. Often a driver may activate the parking brake in order to lock the non-driven wheels when the driver intends to park the vehicle for a length of time. A parking brake signal (Prk_Brk) may be sent to the vehicle controller 34 upon the activation or engagement of the parking brake, and may be also indicate a trip conclusion. A GPS location (GPS) may indicate a trip conclusion a number of ways. For instance, the GPS location may indicate when the vehicle 10 has reached a target destination entered into the navigation system 68. Moreover, if the GPS location corresponds to a stored GPS location (e.g., a home residence), the vehicle controller 34 may infer that the driver has reached his or her destination. The GPS location information may be shared by the navigation system 68.

According to one or more embodiments of the present application, the input signals 74 may be further indicative of a charger connectivity status. The charger connectivity status may indicate whether the vehicle 10 is connected to an external power supply (e.g., "on plug") or disconnected from an external power supply (e.g., "off plug"). Thus, the vehicle controller 34 may receive a plug switch signal (Plg_SW) indicating the charger connectivity status. Moreover, the input signals 74 may be further indicative of an ambient temperature ($T_{amb}$). The ambient temperature ($T_{amb}$) is indicative of the external environmental conditions of the vehicle 10. According to one or more embodiments, the ambient temperature ($T_{amb}$) may be received from the climate control system 40.

According to one or more embodiments of the present application, the vehicle controller 34 may output the plug-in advisory signal 76 when the input signals 74 indicate a trip has concluded, the Charger 54 is not connected to an external power supply, and the ambient temperature ($T_{amb}$) is below a first ambient temperature threshold ($T_{amb\_low}$). The first ambient temperature threshold ($T_{amb\_low}$) may be a preset threshold calibrated to an ambient temperature value in which vehicle performance is limited by a predetermined amount due to an overly cold battery. The vehicle controller 34 may also output the plug-in advisory signal 76 when the input signals 74 indicate a trip has concluded, the Charger 54 is not connected to an external power source, and the ambient temperature ($T_{amb}$) is above a second ambient temperature threshold ($T_{amb\_high}$). The second ambient temperature threshold ($T_{amb\_high}$) may be a preset threshold calibrated to an ambient temperature value in which vehicle performance is limited by a predetermined amount due to an overly warm or hot battery.

The vehicle controller 34 may output the same plug-in advisory signal regardless of whether the ambient temperature ($T_{amb}$) is below the first ambient temperature threshold ($T_{amb\_low}$) or above the second ambient temperature threshold ($T_{amb\_high}$). In this regard, the plug-in advisory signal 76 may correspond to a generic plug-in advisory message (PlgIn_Msg) that may be output by the user interface 70. When conveyed to the driver, the plug-in advisory message may recommend or encourage the driver to connect the vehicle 10 to an external power supply for optimum performance in extreme temperatures (e.g., outside a predetermined temperature range defined by the first ambient temperature threshold ($T_{amb\_low}$) and the second ambient temperature threshold ($T_{amb\_high}$)). In doing so, the driver may avoid limited performance conditions resulting from the vehicle 10 being off for an extended period of time in extreme ambient conditions. Alternatively, the vehicle controller 34 may output different plug-in advisory signals 76 based on whether the ambient temperature ($T_{amb}$) is below the first ambient temperature threshold ($T_{amb\_low}$) or above the second ambient temperature threshold ($T_{amb\_high}$). For instance, the plug-in advisory signal 76 may correspond to a low temperature plug-in advisory message (Low_PlgIn_Msg) when the ambient temperature ($T_{amb}$) is below the first ambient temperature threshold ($T_{amb\_low}$). Moreover, the plug-in advisory signal 76 may correspond to a high temperature plug-in advisory message (High_PlgIn_Msg) when the ambient temperature ($T_{amb}$) is above the second ambient temperature threshold ($T_{amb\_high}$).

When conveyed to the driver, the low temperature plug-in advisory message (Low_PlgIn_Msg) may recommend or encourage the driver to connect the vehicle 10 to an external power supply for optimum performance in relative low temperatures (e.g., anything below the first ambient temperature threshold). In doing so, the driver may avoid limited performance conditions resulting from the vehicle 10 being off for an extended period of time in extreme cold temperatures. When conveyed to the driver, the high temperature plug-in advisory message (High_PlgIn_Msg) may recommend or encourage the driver to connect the vehicle 10 to an external power supply for optimum performance in relative high temperatures (e.g., anything above the second ambient temperature threshold). In doing so, the driver may avoid limited performance conditions resulting from the vehicle 10 being off for an extended period of time in extreme hot temperatures.

Figure 3:
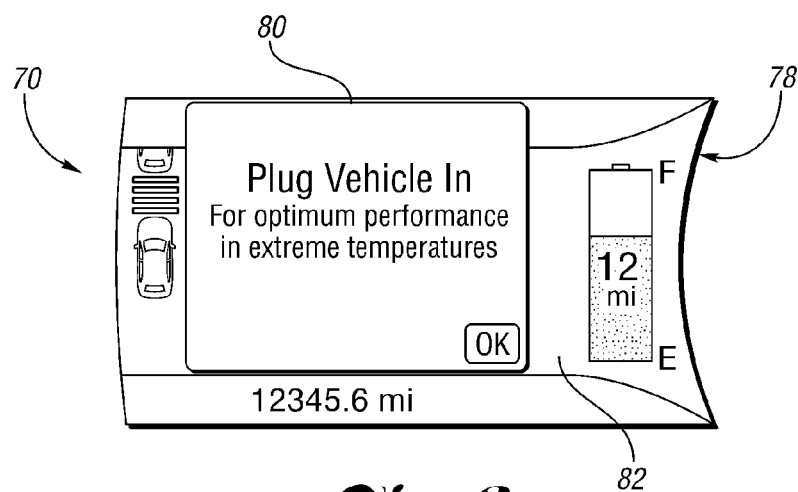
FIG. 3 depicts an exemplary plug-in advisory message that may be output by a user interface, in accordance with one or more embodiments of the present application.

FIG. 3 depicts an exemplary plug-in advisory message (PlgIn_Msg) that may be output by the user interface 70 in response to the plug-in advisory signal 76, in accordance with one or more embodiments of the present application. As seen therein, the user interface 70 may include at least one display 78 and associated circuitry, including hardware and/or software, necessary to communicate with the vehicle controller 34 and operate the display 78. The display 78 may be generally used to convey relevant vehicle content to a driver of the vehicle 10 including, for example, information relating to the operation of the vehicle 10 or advice for improving vehicle performance and/or efficiency. The display 78 may be disposed within a dashboard (not shown) of the vehicle 10, such as in an instrument panel or center console area. Moreover, the display 78 may be part of another user interface system, such as the navigation system 68, or may be part of a dedicated information display system. The display 78 may be a liquid crystal display (LCD), a plasma display, an organic light emitting display (OLED), or any other suitable display. The display 78 may include a touch screen for receiving driver input associated with selected areas of the display 78. The user interface 70 or display 78 may also include one or more buttons (not shown), including hard keys or soft keys, for effectuating driver input.

Figure 4:
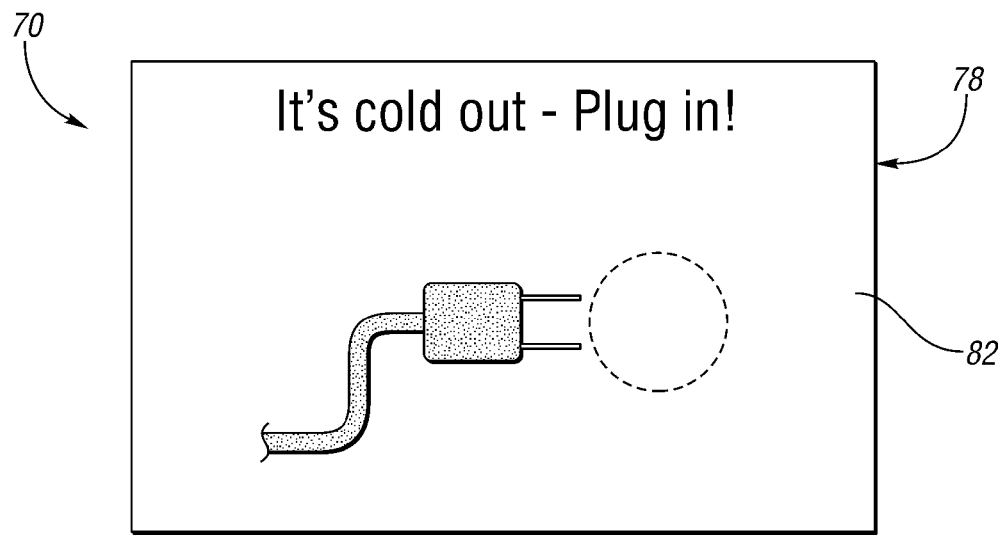
FIG. 4 depicts an exemplary low temperature plug-in advisory message that may be output by the user interface, in accordance with one or more embodiments of the present application.

According to one or more embodiments, the plug-in advisory message (PlgIn_Msg) may be a pop-up message 80 that is displayed over a display screen 82 when the above-described conditions are met. As shown in FIG. 3, the plug-in advisory message may be a generic plug-in advisory message for when the ambient temperature ($T_{amb}$) is either below the first ambient temperature threshold ($T_{amb\_low}$) or above the second ambient temperature threshold ($T_{amb\_high}$). Alternatively, the entire display screen 82, or a portion thereof, may transition to the plug-in advisory message, as shown by the example in FIG. 4. FIG. 4 depicts an exemplary low temperature plug-in advisory message (Low_PlgIn_Msg) that may be output by the user interface 70 in response to the plug-in advisory signal 76, in accordance with one or more embodiments of the present application.

The specific plug-in advisory messages illustrated in FIGS. 3 and 4 are merely exemplary; alternate messages may be displayed or otherwise conveyed by the user interface 70 without departing from the scope of the present application. Additionally or alternatively, the user interface 70 may include at least one speaker or telltale (not shown) for conveying the plug-in advisory messages. The speaker may output the plug-in advisory message audibly in response to the input signals 74. The telltale may be disposed within the dashboard similar to the display 78. The telltale may be a dedicated indicator that illuminates when the conditions for outputting the plug-in advisory message are satisfied.

Referring back to FIG. 2, the control system 72 may further include the charging port light 62 associated with the charging port 56. According to one or more embodiments of the present application, the charging port light 62 may illuminate in response to a charging port light signal (ChrgPrtLt_PlgIn) output by the vehicle controller 34. The illumination of the charging port light 62 in response to the charging port light signal (ChrgPrtLt_PlgIn) may also serve as a reminder to the driver of the vehicle 10 to plug the vehicle 10 into an external power supply at the conclusion of a trip when the ambient temperature conditions are extreme.

Since the charging port light 62 may be disposed on the vehicle's exterior, the vehicle controller 34 may not output the charging port light signal (ChrgPrtLt_PlgIn) until the driver has exited the vehicle 10. Accordingly, the input signals 74 received by the vehicle controller 34 may be further indicative of driver egress. In this regard, the vehicle controller 34 may be configured to detect or at least infer driver egress from the input signals 74. For instance, the vehicle controller 34 may detect driver egress from the vehicle 10 when the ignition switch transitions to the OFF position and a driver door closes. As previously described, the transition of the ignition switch to the off position may be indicated by the ignition switch signal (Ign_SW). Moreover, the driver door closing may be indicated by a driver door signal (DrvrDr_SW). Thus, the vehicle controller 34 may output the charging port light signal (ChrgPrtLt_PlgIn) when driver egress is detected, the Charger 54 is disconnected from the external power supply, and the ambient temperature ($T_{amb}$) is below the first ambient temperature threshold ($T_{amb\_low}$) or above the second ambient temperature threshold ($T_{amb\_high}$).

The charging port light signal (ChrgPrtLt_PlgIn) may cause the charging port light 62 to at least temporarily illuminate when the driver turns the vehicle 10 off and exits the vehicle (e.g., by closing the driver door). The charging port light 62 may remain illuminated for a brief period of time sufficient to gain the attention of the driver upon exiting the vehicle 10. The charging port light signal (ChrgPrtLt_PlgIn) may cause the charging port light 62 to pulse for a predetermined period of time after the driver exits the vehicle 10 in order to remind or invite the driver to plug the vehicle 10 into an external power supply to keep the battery at temperatures where performance will not be limited.

The plug-in advisory message and or the charging port light illumination may encourage drivers to plug their vehicles into an external power supply, if available, when they reach their destination and the ambient temperature conditions are relatively extreme. In doings so, limited vehicle performance due to extreme hot or cold battery temperatures may be avoided during the next driving event.

According to one or more embodiments of the present application, the input signals 74 received by the vehicle controller 34 may be further indicative of the temperature of the main battery ($T_{batt}$). Moreover, the vehicle controller 34 may output a limited performance reminder signal 84 at vehicle startup when the main battery 26 is at a temperature that noticeably limits the performance of the vehicle 10. For example, the vehicle controller 34 may receive input signals 74 indicative of the ignition switch position (Ign_SW) and battery temperature ($T_{batt}$) and output the limited performance reminder signal 84 based on the input signals 74. In particular, the vehicle controller 34 may output the limited performance reminder signal 84 when the ignition switch is in the ON position and the battery temperature ($T_{batt}$) is either below a first battery temperature threshold ($T_{batt\_low\_limit}$) or above a second battery temperature threshold ($T_{batt\_high\_limit}$).

Figure 5:
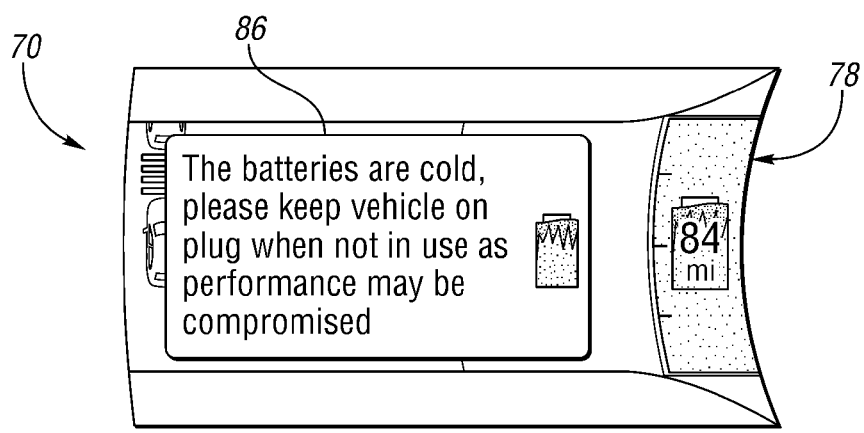
FIG. 5 depicts an exemplary limited vehicle performance reminder message that may be displayed in accordance with one or more embodiments of the present application.

The limited performance reminder signal 84 may be associated with a limited performance reminder message (Ltd_Perf_Msg) and may be transmitted to the user interface 70. Accordingly, the user interface 70 may output the limited performance reminder message (Ltd_Perf_Msg) in response to receiving the limited performance reminder signal 84. The limited performance reminder message (Ltd_Perf_Msg) may convey to the driver that vehicle performance may be limited due to cold (or hot) battery temperatures. FIG. 5 depicts an exemplary limited performance reminder message due to a cold battery that may be displayed in accordance with one or more embodiments of the present application. As shown, the limited performance reminder message (Ltd_Perf_Msg) may also remind the driver to keep the vehicle 10 on plug when not in use or otherwise expect some degradation in vehicle performance. The limited performance reminder message (Ltd_Perf_Msg) may be output by the user interface 70 as a pop-up display message 86 or a welcome screen message (not shown) on the display 78 when the vehicle 10 is started.

Figure 6:
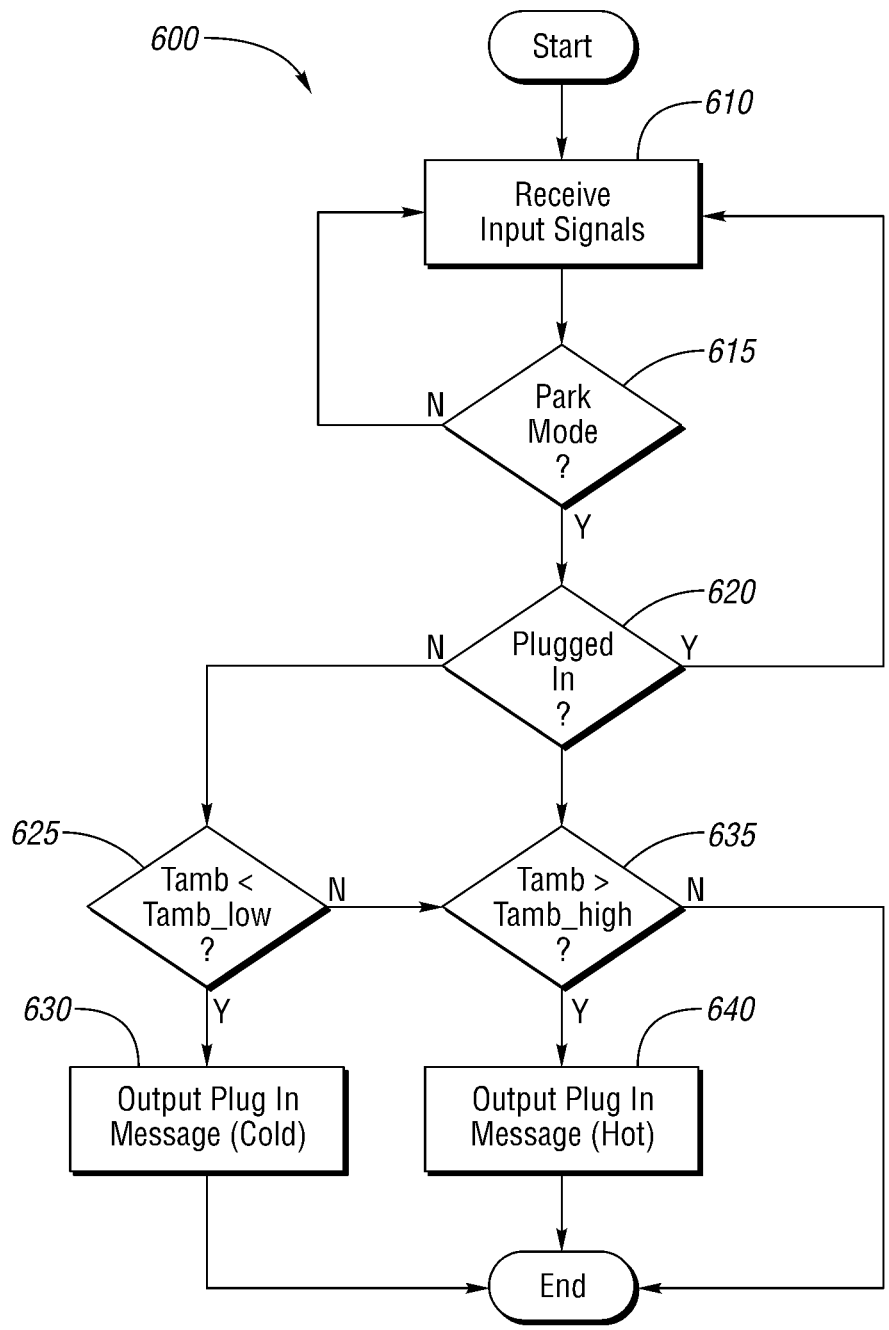
FIG. 6 is a simplified, exemplary flow chart depicting a method for conveying a plug-in advisory message in accordance with one or more embodiments of the present application.

FIG. 6 is a simplified, exemplary flow chart depicting a method 600 for conveying a plug-in advisory message in accordance with one or more embodiments of the present application. At step 610, the control system 72 may receive the input signals 74. As previously described, the input signals 74 may be indicative of a trip conclusion (e.g., transition to park mode), the charger connectivity status, and the ambient temperature. Accordingly, in one or more embodiments, the vehicle controller 34 may receive the transmission mode input signal (Trans_Mode), the plug switch signal (Plg_SW), and the ambient temperature ($T_{amb}$). The control system 72 may determine whether the transmission 32 is in the park mode, or alternatively, whether the transmission 32 has just transitioned to the park mode based on the transmission mode signal (Trans_Mode), at step 615. If the transmission 32 is not in the park mode, then the method may return to step 610 to continue monitoring the input signals 74. If, on the other hand, the transmission 32 is in the park mode, the method may proceed to step 620. At step 620, the control system 72 may determine the charger connectivity status. In particular, the control system 72 may determine whether the vehicle 10 is plugged in to an external power supply via the plug switch signal (Plg_SW). If the Charger 54 is connected to an external power supply, the method may return to step 610. Alternatively, the method may end. If, however, the charger 54 is not connected to an external power supply, the method may proceed to step 625.

At step 625, the control system 72 may compare the ambient temperature ($T_{amb}$) to the first ambient temperature threshold ($T_{amb\_low}$). If the ambient temperature ($T_{amb}$) is below the first ambient temperature threshold ($T_{amb\_low}$), the method may proceed to step 630. At step 630, the user interface 70 may output a plug-in advisory message encouraging the driver to plug the vehicle 10 in to an external power supply due to the extreme (cold) ambient temperature. The plug-in advisory message may be specific to the relatively cold ambient conditions (e.g., Lo_PlgIn_Msg), or may be a generic plug-in advisory message (e.g., PlgIn_Msg). Thereafter, the method may conclude. If at step 625, however, the ambient temperature ($T_{amb}$) is not below the first ambient temperature threshold ($T_{amb\_low}$), the method may proceed to step 635. At step 635, the control system 72 may compare the ambient temperature ($T_{amb}$) to the second ambient temperature threshold ($T_{amb\_high}$). If the ambient temperature ($T_{amb}$) is above the second ambient temperature threshold ($T_{amb\_high}$), the method may proceed to step 640. At step 640, the user interface 70 may output a plug-in advisory message encouraging the driver to plug the vehicle 10 in to an external power supply due to the extreme (hot) ambient temperature. The plug-in advisory message may be specific to the relatively hot ambient conditions (e.g., Hi_PlgIn_Msg), or may be a generic plug-in advisory message (e.g., PlgIn_Msg). Thereafter, the method may conclude. If at step 635, however, the ambient temperature ($T_{amb}$) is not above the second ambient temperature threshold ($T_{amb\_high}$), the method may conclude without conveying a plug-in advisory message.

FIG. 7 is a simplified, exemplary flow chart depicting a method 700 for illuminating the charging port 56 using the charging port light 62 in accordance with one or more embodiments of the present application. In the illustrated embodiment, the illumination of the charging port 56 may be in addition to outputting the plug-in advisory message (PlgIn_Msg). Accordingly, the method may begin at step 710, wherein the control system 72 may determine whether the conditions for outputting the plug-in advisory signal 76 are satisfied (see, for example, FIG. 6). In particular, the control system 72 may determine whether a trip has concluded (e.g., Trans_Mode=Park), whether the charger 54 is plugged in to an external power supply, and whether the ambient temperature ($T_{amb}$) is below the first ambient temperature threshold ($T_{amb\_low}$) or above the second ambient temperature threshold ($T_{amb\_high}$). If no plug-in advisory message is output by the user interface 70, the method may continue to monitor the conditions for causing the plug-in advisory message to be output. If, on the other hand, the conditions for outputting the plug-in advisory message are satisfied, the method may proceed to step 715. At step 715, the control system 72 may determine whether the vehicle 10 has been turned off. For instance, the control system 72 may determine whether the ignition switch is on the OFF position or has transitioned to the OFF position via the ignition switch signal (Ign_SW). If the ignition switch is not in the OFF position, the method may loop back to step 715 to continue monitoring the ignition switch signal (Ign_SW). If, however, the ignition switch is in the OFF position, the method may proceed to step 720. At step 720, the control system 72 may detect whether the driver door has been closed via the driver door signal (DrvrDr_SW). If the driver door has not been closed, then the control system 72 may conclude that the driver has not yet exited the vehicle 10. Thus, the method may loop back to step 720 and continue to monitor the driver door signal (DrvrDr_SW). If the driver door has been closed, however, the control system 72 may conclude that the driver has exited the vehicle 10. Accordingly, the method may proceed to step 725. At step 725, the vehicle controller 34 may output the charging port light signal (ChrgPrtLt_PlgIn) causing the charging port light 62 to illuminate, at least temporarily. For instance, the charging port light 62 may pulse on and off for a duration of time as a reminder to the driver to plug the vehicle 10 in to an external power supply.

FIG. 8 is a simplified, exemplary flow chart depicting a method 800 for conveying a limited performance reminder message (Ltd_Perf_Msg) in accordance with one or more embodiments of the present application. As previously described, the limited performance reminder message (Ltd_Perf_Msg) may be output by the user interface 70 upon vehicle startup when the battery temperature ($T_{batt}$) is below the first battery temperature threshold ($T_{batt\_low\_limit}$) or above the second battery temperature threshold ($T_{batt\_high\_limit}$). Accordingly, at step 810, the control system 72 may receive input signals 74 indicative of the ignition switch position (Ign_SW) and the battery temperature ($T_{batt}$). At step 815, the control system 72 may determine whether the ignition switch is in an active position (e.g., accessories position or ON position) or has transitioned to the active position. The method may return to step 810 if the vehicle 10 has not been "keyed on." If, however, the ignition switch is in the active position, the method may proceed to step 820. At step 820, the control system 72 may compare the battery temperature ($T_{batt}$) to either the first battery temperature threshold ($T_{batt\_low\_limit}$) or the second battery temperature threshold ($T_{batt\_high\_limit}$). If the battery temperature ($T_{batt}$) is not below the first battery temperature threshold ($T_{batt\_row\_limit}$) or above the second battery temperature threshold ($T_{batt\_high\_limit}$), the method may return to step 810. Alternately, the method may conclude. If, on the other hand, the battery temperature ($T_{batt}$) is below the first battery temperature threshold ($T_{batt\_low\_limit}$) or above the second battery temperature threshold ($T_{batt\_high\_limit}$), the method may proceed to step 825. At step 825, the user interface 70 may output the limited performance reminder message (Ltd_Perf_Msg). For instance, the user interface 70 may display the limited performance reminder message on a welcome screen or other display screen 82 to remind the driver that the vehicle 10 may be performance limited due to an extreme cold or hot battery temperature. The limited performance reminder message (Ltd_Perf_Msg) may further encourage or remind the driver to consider plugging the vehicle 10 to an external power supply when not is use to avoid a degradation in performance.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A control system for a vehicle comprising:
a controller configured to output a plug-in advisory signal when it receives input signals indicating a transmission has transitioned to park mode, a vehicle charger is disconnected from an external power source, and ambient temperature is below a first ambient temperature threshold; and
a user interface in communication with the controller and configured to output a plug-in advisory message in response to the plug-in advisory signal.

2. The control system of claim 1, wherein the plug-in advisory message includes a recommendation to plug the vehicle into the external power source due to a low ambient temperature.

3. The control system of claim 1, wherein the controller is further configured to output the plug-in advisory signal when it receives input signals indicating the vehicle is in the park mode, the vehicle charger is disconnected from the external power source, and the ambient temperature is above a second ambient temperature threshold.

4. The control system of claim 3, wherein the plug-in advisory message includes a recommendation to plug the vehicle into the external power source due to a high ambient temperature when the ambient temperature is above the second ambient temperature threshold.

5. The control system of claim 1, wherein the controller is further configured to detect driver egress from the vehicle and output a charging port light signal when the vehicle is in the park mode, the vehicle charger is disconnected from the external power source, the ambient temperature below the first ambient temperature threshold or above a second ambient temperature threshold, and driver egress is detected.

6. The control system of claim 5, wherein driver egress is detected when an ignition switch transitions to an OFF position and a driver door closes.

7. The control system of claim 5, wherein the charging port light signal illuminates a charging port light associated with a charging port and disposed proximate thereto.

8. The control system of claim 1, wherein the user interface includes a display configured to convey the plug-in advisory message visually.

9. The control system of claim 1, wherein the user interface includes a speaker configured to convey the plug-in advisory message audibly.

10. A control method for a vehicle comprising:
receiving input signals indicative of a trip conclusion, charger connectivity status and ambient temperature; and
outputting a plug-in advisory message via a user interface when the input signals indicate a trip has concluded, the charger connectivity status is disconnected, and the ambient temperature is outside a predetermined temperature range.

11. The method of claim 10, wherein the input signals indicative of the trip conclusion includes input signals indicative of at least one of a transition of an ignition switch to an OFF position, an activation of a parking brake, and a transition of a transmission to a park mode.

12. The method of claim 10, wherein the user interface includes a display and the step of outputting the plug-in advisory message includes displaying the plug-in advisory message using the display.

13. The method of claim 10, further comprising:
detecting driver egress from the vehicle; and
illuminating a charging port light associated with a charging port and disposed proximate thereto.

14. The method of claim 13, wherein the driver egress is detected when an ignition switch transitions to an OFF position and a driver door closes.

15. A control system for a vehicle comprising:
a controller configured to receive input signals indicative of an ignition switch position and battery temperature, and output a reminder signal when an ignition switch is in an active position and the battery temperature is outside a predetermined temperature range; and
a user interface in communication with the controller and configured to output a limited performance reminder message in response to the reminder signal.

16. The control system of claim 15, wherein the active position includes at least one of an accessories position and an ON position.

\* \* \* \* \*